United States Patent
Wahler (10) Patent No.: US 7,139,857 B2
(45) Date of Patent: Nov. 21, 2006

(54) METHOD AND APPARATUS FOR HANDLING INTERRUPTS

(75) Inventor: Richard E. Wahler, St. James, NY (US)

(73) Assignee: Standard Microsystems Corporation, Hauppauge, NY (US)

( * ) Notice: Subject to any disclaimer, the term of this patent is extended or adjusted under 35 U.S.C. 154(b) by 334 days.

(21) Appl. No.: 10/706,741

(22) Filed: Nov. 12, 2003

(65) Prior Publication Data

US 2005/0102460 A1   May 12, 2005

(51) Int. Cl.
   *G06F 9/46*   (2006.01)
(52) U.S. Cl. .................... 710/269; 710/266; 710/268
(58) Field of Classification Search .................... None
   See application file for complete search history.

(56) References Cited

U.S. PATENT DOCUMENTS

| | | | |
|---|---|---|---|
| 4,788,639 A | 11/1988 | Tamaru | |
| 5,101,199 A * | 3/1992 | Suzuki | 370/449 |
| 5,392,033 A | 2/1995 | Oman et al. | |
| 5,428,799 A * | 6/1995 | Woods et al. | 710/266 |
| 5,561,788 A * | 10/1996 | Letwin | 703/22 |
| 5,734,911 A * | 3/1998 | Lai | 710/269 |
| 5,887,164 A * | 3/1999 | Gupta | 713/2 |
| 5,978,882 A * | 11/1999 | Adams | 711/2 |
| 6,484,281 B1 | 11/2002 | Wang et al. | |
| 6,618,779 B1 * | 9/2003 | Branch | 710/261 |
| 2005/0154810 A1 * | 7/2005 | Chong et al. | 710/200 |

* cited by examiner

*Primary Examiner*—Glenn A. Auve
(74) *Attorney, Agent, or Firm*—Meyertons Hood Kivlin Kowert & Goetzel, P.C.; Jeffrey C. Hood; Erik A. Heter (57) ABSTRACT

An apparatus and method for handling an interrupt are disclosed. In one embodiment, a processor may receive an interrupt request corresponding to a particular interrupt. The particular interrupt may be one of a group of interrupts. Responsive to receiving the interrupt request, the processor may substitute a vector corresponding to the group of interrupts with a vector corresponding to the particular interrupt. Responsive to the substitution, the processor may then jump to a service routine corresponding to the particular interrupt. Execution of the service routine may resolve the condition which initially caused the interrupt request.

20 Claims, 6 Drawing Sheets

| Addr | Instruction | Bytes | Cycles | |
|---|---|---|---|---|
| 53 | LJMP (IRQ0JT+offset) | 3 | 4 | (IRQ4JT+offset) is set by the IRQ state machine based on the active sub-IRQ4 interrupt |
| 54 | - | | | |
| 55 | - | | | |
| 56 | - | | | |
| 57 | - | | | |
| 58 | - | | | |
| 59 | - | | | |
| 5A | - | - | - | |

405

| Addr | Instruction | Bytes | Cycles | Comment |
|---|---|---|---|---|
| IRQ4JT | | | | IRQ4 Jump Table The location of this table is fixed by hardware and cannot be moved. |
| +00 | LJMP IRQ4.0 | 3 | 4 | IRQ4 Bit 0 service routine |
| +04 | LJMP IRQ4.1 | 3 | 4 | IRQ4 Bit 1 service routine |
| +08 | LJMP IRQ4.2 | 3 | 4 | IRQ4 Bit 2 service routine |
| +0C | LJMP IRQ4.3 | 3 | 4 | IRQ4 Bit 3 service routine |
| +10 | LJMP IRQ4.4 | 3 | 4 | IRQ4 Bit 4 service routine |
| +14 | LJMP IRQ4.5 | 3 | 4 | IRQ4 Bit 5 service routine |
| +18 | LJMP IRQ4.6 | 3 | 4 | IRQ4 Bit 6 service routine |
| +1C | LJMP IRQ4.7 | 3 | 4 | IRQ4 Bit 7 service routine |
| +20 | LJMP IRQ none | 3 | 4 | No IRQ4's are active-go to a null routine. This could have just a RETI or other processing. |

Modify ROM Code Table 405

| Addr | Instruction | Bytes | Cycles | |
|---|---|---|---|---|
| 53 | LJMP (EIRQ4) | 3 | 4 | (EIRQ4) Is the entry into the extended Jump table. |
| 54 | - | | | |
| 55 | - | | | |
| 56 | - | | | |
| 57 | - | | | |
| 58 | - | | | |
| 59 | - | | | |
| 5A | - | - | - | |

407

| Addr | Instruction | Bytes | Cycles | Comment |
|---|---|---|---|---|
| | | | | The location of this table is fixed by hardware and cannot be moved. there is a table similar to this for each interrupt |
| EIRQ0 | LJMP (IRQ0JT+offset) | 3 | 4 | |
| EIRQ1 | LJMP (IRQ1JT+offset) | 3 | 4 | |
| EIRQ2 | LJMP (IRQ2JT+offset) | 3 | 4 | |
| EIRQ3 | LJMP (IRQ3JT+offset) | 3 | 4 | |
| EIRQ4 | LJMP (IRQ4JT+offset) | 3 | 4 | Jump to offset into IRQ4JT |
| EIRQ5 | LJMP (IRQ5JT+offset) | 3 | 4 | |
| EIRQ6 | LJMP (IRQ6JT+offset) | 3 | 4 | |
| EIRQ7 | LJMP (IRQ7JT+offset) | 3 | 4 | |
| EIRQN | LJMP (EIRQN+offset) | 3 | 4 | No interrupt is active, jump to a null routine. |
| | | | | |
| | | | | |

410

| Addr | Instruction | Bytes | Cycles | Comment |
|---|---|---|---|---|
| EIRQ0 | | | | IRQ4 Jump Table<br>The location of this table is fixed by hardware and cannot be moved. There is a table similar to this for each interrupt. |
| +00 | LJMP IRQ4.0 | 3 | 4 | IRQ4 Bit 0 service routine |
| +04 | LJMP IRQ4.1 | 3 | 4 | IRQ4 Bit 1 service routine |
| +08 | LJMP IRQ4.2 | 3 | 4 | IRQ4 Bit 2 service routine |
| +0C | LJMP IRQ4.3 | 3 | 4 | IRQ4 Bit 3 service routine |
| +10 | LJMP IRQ4.4 | 3 | 4 | IRQ4 Bit 4 service routine |
| +14 | LJMP IRQ4.5 | 3 | 4 | IRQ4 Bit 5 service routine |
| +18 | LJMP IRQ4.6 | 3 | 4 | IRQ4 Bit 6 service routine |
| +1C | LJMP IRQ4.7 | 3 | 4 | IRQ4 Bit 7 service routine |
| +20 | LJMP IRQ none | 3 | 4 | No IRQ4's are active-go to a null routine. This could have just a RETI or other processing. |
| | | | | |
| | | | | |

METHOD AND APPARATUS FOR HANDLING INTERRUPTS

BACKGROUND OF THE INVENTION

1. Field of the Invention

This invention relates to computer systems, and more particularly, the handling of interrupts by a processor of a computer system.

2. Description of the Related Art

Computer systems typically include a number of devices that perform various functions. A typical computer system includes at least one processor and may have a number of peripheral devices coupled to one or more buses. The one or more buses may be directly coupled to the processor, or may be coupled to the processor through a bus bridge. Examples of peripheral buses include the peripheral component interface (PCI) bus and the universal serial bus (USB). In addition to peripheral devices coupled to the peripheral buses, a computer system may also include various input/output devices (e.g., keyboard, mouse) as well as storage devices (e.g., a hard disk drive). These devices in a computer system may signal a need to communicate with the processor by using an interrupt.

An interrupt signal (often times referred to as an interrupt request) may be conveyed to the processor through an interrupt line. After receiving the interrupt request, the processor may temporarily halt the execution of an instruction stream to deal with the, interrupt by performing a service routine, which may resolve the condition that initially triggered the interrupt request.

As the functionality and complexity of computer systems has increased, the number of sources for interrupts has also increased. Often times, interrupts are arranged into groups. Different service routines may be performed for each interrupt of an interrupt group. A given processor may also have the capability of enabling or disabling specific interrupts, and may also include priority encoding logic to determine which interrupt should be resolved first when more than one interrupt request is pending.

When an interrupt request is received, a processor may be required to perform a number of steps before the request can be resolved. When a large number of interrupts are present and arranged into groups, the processor may first execute instructions to determine which one of the interrupts of the group to which the interrupt request corresponds (i.e. the source of the interrupt). Following this determination, additional instructions may be executed in order to determine if the interrupt corresponding with the interrupt request is enabled or not. If the corresponding interrupt is enabled, the processor may be required to perform an additional step of determining the source of the interrupt and whether or not it is enabled, the processor may be required to resolve the priority of the interrupt with respect to a number of pending interrupt requests. Due to these various factors, it may take a significant amount of time for a processor to resolve each interrupt request. The amount of time required to resolve each interrupt request can have an adverse affect on system performance. Furthermore, the amount of time required to resolve interrupt requests may exceed operating margins for some devices which may generate interrupts, thus preventing their use in the system.

SUMMARY OF THE INVENTION

An apparatus and method for handling an interrupt are disclosed. In one embodiment, a processor may receive an interrupt request corresponding to a particular interrupt. The particular interrupt may be one of a group of interrupts. Responsive to receiving the interrupt request, the processor may substitute a vector corresponding to the group of interrupts with a vector corresponding to the particular interrupt. Responsive to the substitution, the processor may then jump to a service routine corresponding to the particular interrupt. Execution of the service routine may resolve the condition which initially caused the interrupt request.

In one embodiment, the processor includes a source register and an enable register. The source register is configured to store a plurality of bits, wherein some of the plurality of bits correspond to particular interrupts of a group of interrupts. The source register may receive the interrupt request and set a bit indicating its occurrence. The enable register is associated with the source register and is therefore configured to store bits which each correspond with one of the interrupts of the group of interrupts. A bit from the source register and its corresponding bit from the enable register may be ANDed together, thereby indicating that an interrupt request for that particular interrupt has been received and that the particular interrupt is enabled. The bit produced by the AND operation is received by a priority encoder, which may resolve the priority of interrupts when more than one interrupt requests is pending.

After the priority encoder has resolved the priority of interrupts, if necessary, the processor performs a trap on an interrupt vector address, which corresponds to the group of interrupts. The processor can then substitute a jump table address. The jump table address is provided from an address unit, and is determined according to the interrupt given immediate priority by the priority encoder. The jump table includes entries for each interrupt of the group, and corresponds to a service routine if one is present for that particular interrupt. In one embodiment, the jump table address includes a group interrupt address and an offset. Executing a jump instruction using the jump table address will then cause the processor to jump to and begin executing a service routine (if any) corresponding to the particular interrupt.

Various embodiments of an address unit for providing the jump address are possible and contemplated. In one embodiment, the address unit is a lookup table having a plurality of entries. Each entry includes a jump table address and information identifying an associated interrupt. In another embodiment, the address unit is configured to calculate a jump table address based on the information corresponding to the particular interrupt. In general, the address unit may be any type of functional unit that provides a jump table address for a particular interrupt.

The processor may, in various embodiments, include a read-only memory (ROM), which may be modified in various ways in order to cause a jump to the service routine when a corresponding interrupt request is received. Other methods of causing this jump are possible and contemplated.

BRIEF DESCRIPTION OF THE DRAWINGS

Other aspects of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE INVENTION

Figure 1:
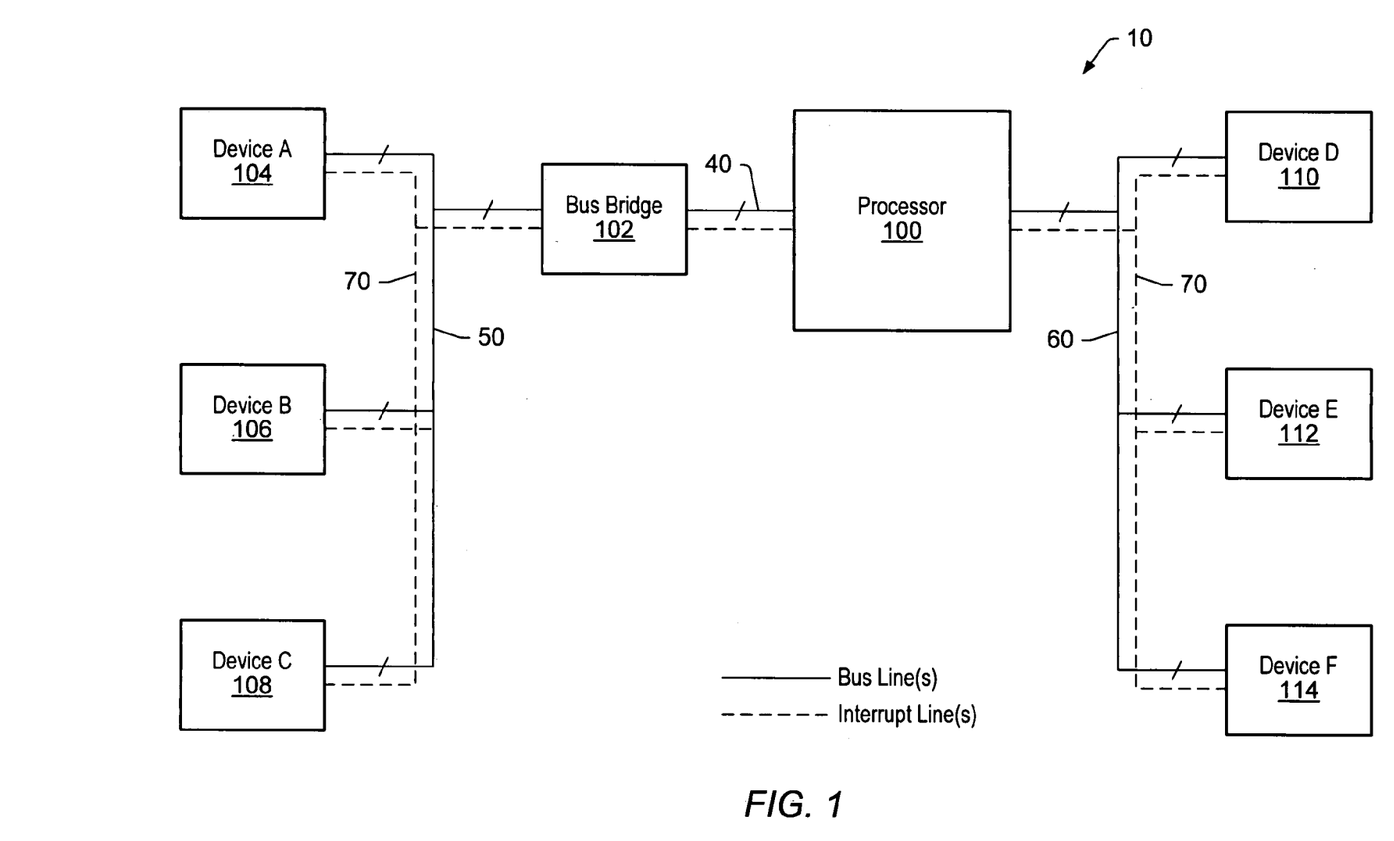
FIG. 1 is a block diagram of one embodiment of a computer system having a plurality of devices coupled to a processor through multiple buses.

Turning now to FIG. 1, a block diagram of one embodiment of a computer system having a plurality of devices coupled to a processor through multiple buses is shown. In the embodiment shown, computer system 10 may be one of several different types of computer systems, such as a personal computer system, a control system, a server, or even a peripheral in a larger computer system. Computer system 10 includes processor 100, which may be a microprocessor, a microcontroller, a digital signal processor, or other type of integrated circuit configured to process information.

Computer system 10 includes devices 104, 106, 108, 110, 112, and 114. These devices may be peripheral devices in a computer system, devices controlled by processor 100 in a control system, devices in a digital signal processing system, or any other type of devices subject to control by a processor. These devices may provide input to the computer system, output from the computer system, or both.

Devices 104, 106 and 108 are coupled to bus bridge 102 via bus 50. Devices 110, 112, and 114 are coupled to processor 100 via bus 60. Each of the devices coupled to one of the buses shown may request service from processor 100 by conveying an interrupt signal from an associated interrupt line 70 (shown as the dashed line; buses 40, 50, and 60 are shown as solid lines). It should be noted that the interrupt lines may be a single signal line or may include multiple signal lines. When requesting service from processor 100, interrupt signals conveyed by devices 104, 106, and 108 are conveyed to the processor through bus bridge 102.

Service requested by one of the devices may take on various forms. For example, if a device is a printer, the service requested may be more data for printing. In another example, the device may be a scanner that is ready to send data after completing a scanning process. Service requests may also be conveyed from a device to processor 100 when the device, previously idle, becomes active again (i.e. 'wakes up'). Because some of the services requested by various devices may be more time-critical than other services, processor 100 may implement a priority system to ensure that the most time-critical services are performed ahead of those that are less time-critical.

Figure 2:
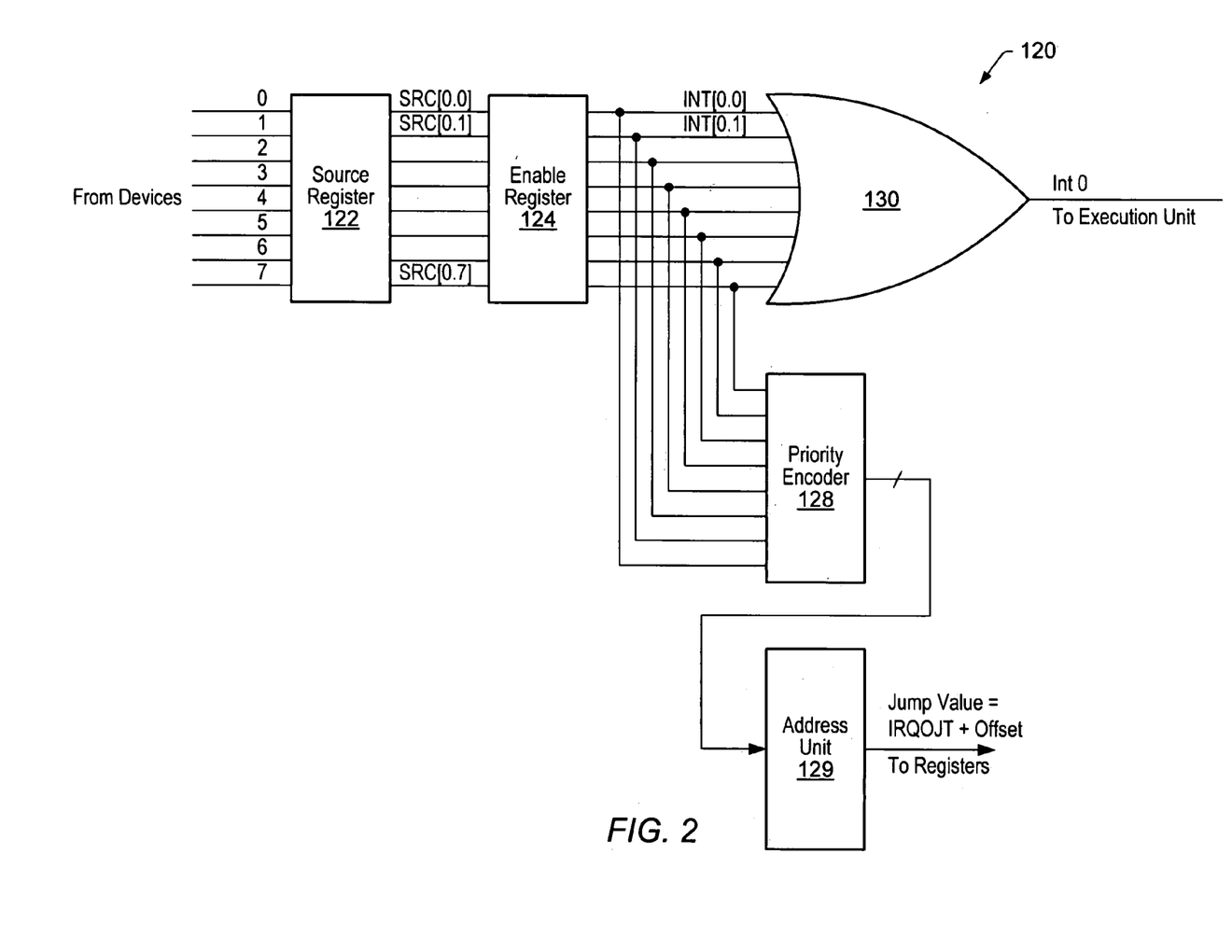
FIG. 2 is a block diagram of one embodiment of logic in a processor that provides a vector corresponding to a particular interrupt.

Moving now to FIG. 2, a block diagram of one embodiment of logic in a processor that provides a vector corresponding to a particular interrupt is shown. Interrupt unit 120 may be one of several similar units implemented in processor 100. In the embodiment shown here, interrupt unit 120 is implemented for a group of interrupts, INT0. A similar interrupt unit may be implemented for interrupt groups labeled INT1, INT2, and so on.

In this particular embodiment, interrupt unit 120 may be coupled to receive interrupts from up to eight different sources. Each interrupt request is received by source register 122. When an interrupt request is received, source register 122 may indicate that a device has requested service from the processor by setting one or more bits corresponding to the interrupt.

Interrupt unit 120 also includes enable register 124, which may store information corresponding to each of the interrupts that are part of the interrupt group. In one embodiment, enable register 124 stored a single bit for each of the interrupts of the interrupt group. When set, the interrupt may be enabled, thus allowing processor 100 to provide service to the requesting source if a corresponding interrupt request is received. If the corresponding bit is not set, the interrupt is not enabled and thus the processor will not provide service to the requesting source even if an interrupt request is received at source register 122. More detail concerning enabling or disabling specific interrupts will be discussed below in reference to FIG. 3.

OR gate 130 is coupled to receive signals indicating that an interrupt has been requested and is enabled. If a service request corresponding to any one the interrupts of the group is received by source register 122 and is indicated as enabled by enable register 124, the INT0 signal will be asserted, indicating that an service request has been received and that the corresponding interrupt is enabled.

The embodiment shown of interrupt unit 120 also includes priority encoder 128. Priority encoder 128 is coupled to receive signals for any enabled interrupt request (that is, source register 122 has received a service request and enable register 124 indicates that the corresponding interrupt is enabled). Since multiple service requests may be present within the same interrupt group at a given time, priority encoder 128 may determine the order in which the service requests are satisfied by the processor. The particular scheme employed by the priority encoder may vary with the particular system in which it is implemented and the potential sources of service requests. Furthermore, in some embodiments the scheme for determining priority of interrupts may be changed if the system is reconfigured.

Interrupt unit 120 also includes address unit 129, which is coupled to receive information from priority encoder 128 indicating the currently selected interrupt. Address unit 129 correlates each interrupt of the group with a corresponding vector. In one embodiment, the vector is an address. The address may be an operand used in an instruction known as a jump instruction. The address corresponding to the particular interrupt may be substituted for an address that corresponds to the entire group of interrupts, and used as the operand for the jump instruction. This will be discussed in further detail below.

Address unit 129 may be implemented in various ways. In one embodiment, address unit 129 is a lookup table having a plurality of entries, wherein each particular interrupt corresponds to an address stored in a table entry. In another embodiment, address unit 129 may be configured to calculate the address corresponding to the particular interrupt based on information received from priority encoder 128. In general, address unit 129 may be any type of functional unit that is configured to provide an address corresponding to a particular interrupt.

It should be noted that while the vector in this embodiment is an address value, embodiment wherein the vector is not an address are possible and contemplate. For example, in another embodiment the vector may correspond to an instruction.

Figure 3:
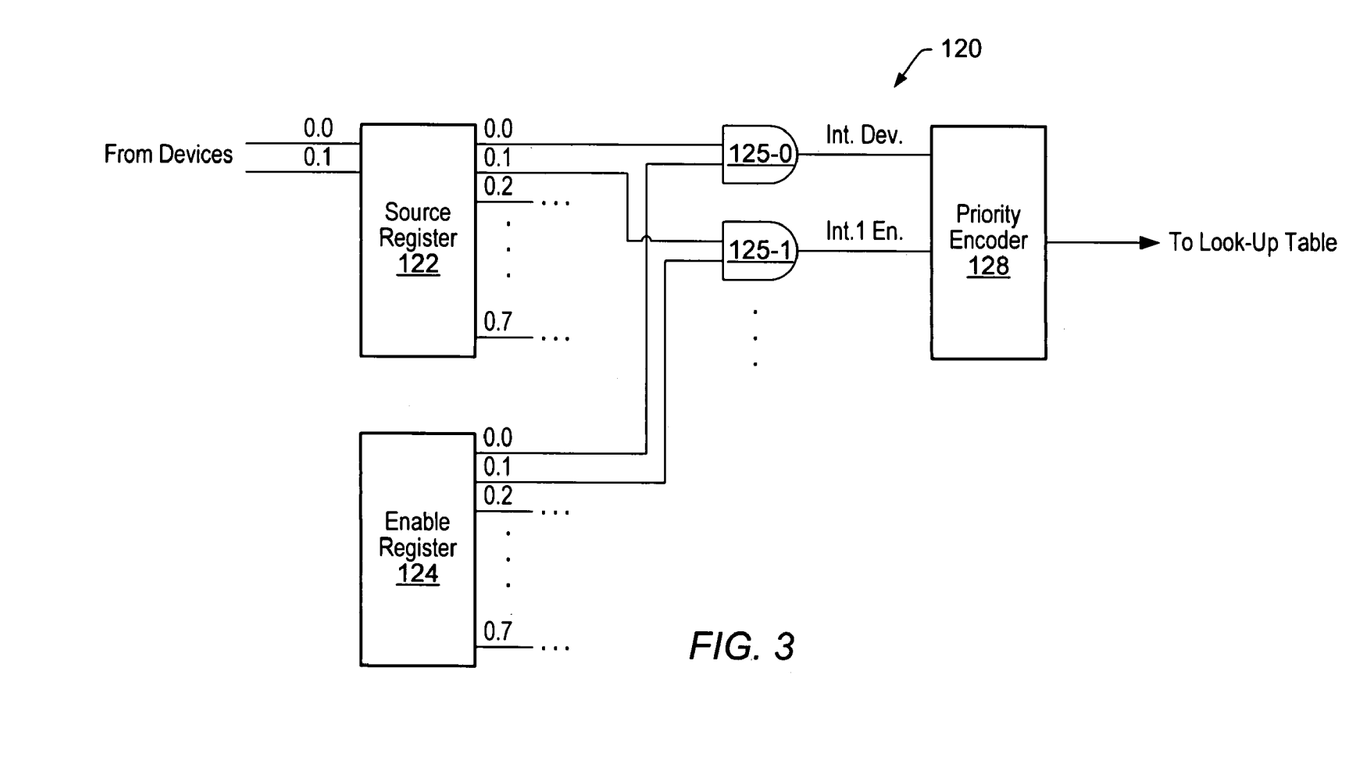
FIG. 3 is a block diagram of one embodiment of logic in a processor for determining the source of an interrupt and whether it is enabled.

FIG. 3 is a block diagram of one embodiment of logic in a processor for determining the source of an interrupt and whether the interrupt is enabled. FIG. 3 further illustrates the operation of interrupt apparatus 120. In the embodiment shown, source register 122 and enable register 124 are each coupled to priority encoder 128 through AND gates. In particular, each AND gate corresponds with one of the interrupts in the group, and is coupled to receive one input each from source register 122 and enable register 124.

AND gate 125-0 is coupled to receive a bits corresponding to interrupt 0 from both source register 122 and enable register 124. If an interrupt request for interrupt 0 has been received by source register 122, bit 0 in the register will be set and be allowed to propagate to one of the input of AND gate 125-0. If interrupt 0 is enabled, its corresponding bit in enable register 124 will be in a set state, and the value of this bit position will propagate to the other input of AND gate 125-0. Thus, when the interrupt has been requested and the interrupt is enabled, the output of AND gate 125-0, INT0-EN will be true. The asserted INT0-EN signal is received by priority encoder indicating the presence of an active and enabled interrupt request. As previously noted, other interrupts may be pending at the same time, and thus priority encoder 128 may indicate the sequence in which the processor handles each of the interrupts.

In the embodiment shown, both source register 122 and enable register 124 have eight bit positions, although embodiments having larger or smaller registers are possible and contemplated. Each of the eight bit positions in the embodiment shown corresponds to one of the interrupts of the interrupt group, and thus eight AND gates are also present. Priority encoder 128 will receive a signal indicating the need for an interrupt for any interrupt request received by source register 122 that is also enabled, as indicated by enable register 124. If an interrupt request is received at source register 122 but is not indicated as enabled by enable register 124, the interrupt request is effectively denied and thus an output signal on a corresponding AND gate will not be asserted.

Figure 4A:
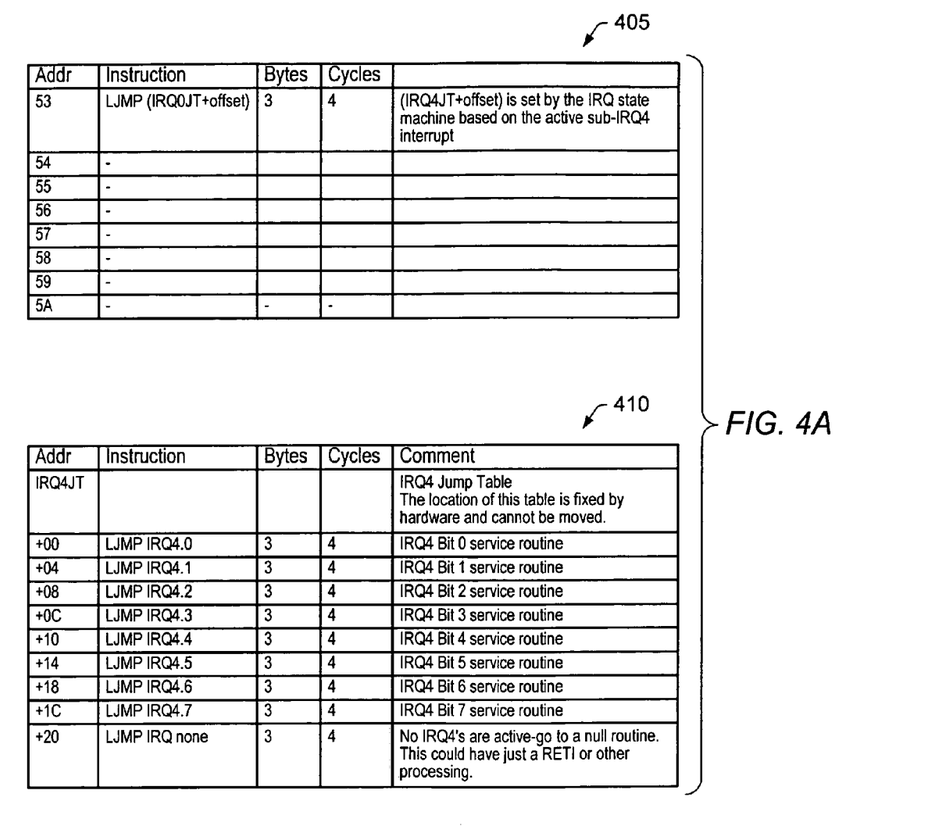
FIG. 4A is a drawing illustrating one embodiment wherein an interrupt vector table is modified in order to cause a jump directly to a service routine for a particular interrupt.

Moving now to FIG. 4A, a drawing illustrating one embodiment wherein an, interrupt vector table is modified in order to cause a jump directly to a service routine for a particular interrupt is shown. FIG. 4A illustrates instruction table 405 and jump table 410. Instruction table 405 shown here is merely a sequence of instructions that may be executed by the processor, and is shown here for illustrative purposes.

In the embodiment shown, instruction table 405 has a jump instruction, LJMP, in address 53 (which is a hexadecimal value in this example). The LJMP instruction indicates a jump to a jump table, and may be issued responsive to the processor receiving an enabled interrupt request. In particular, the LJMP instruction may be issued responsive to an interrupt apparatus (or IRQ state machine as denoted here) providing an indication of an active interrupt request. The jump address that is initially issued with the LJMP instruction may correspond to a group interrupt, such as the IRQ4 group in this particular example. However, in this embodiment, the address issued with the LJMP address is trapped, and replaced with an address that includes both the group interrupt address and the offset value. In one embodiment, the address having the offset value is provided by address unit 129 associated with interrupt apparatus 120 discussed above. Embodiments using a different method and apparatus for providing the address with an offset value are also possible and contemplated.

In this embodiment, the address having the offset is located in jump table 410. Jump table 410 includes both a group address, which is the address without the offset, as well as each of the addresses with an offset. In each address location with an offset, jump table 410 stores another LJMP instruction that corresponds to a particular service routine. Each of the service routines defines a sequence of steps the processor may perform in order to resolve the corresponding interrupt.

When the LJMP instruction in instruction table 405 is executed it will cause a jump into the jump table to the particular address/offset. In this embodiment, the interrupt group is labeled IRQ4, and thus, execution of the LJMP instruction will cause a jump into the jump table corresponding to IRQ4, and specifically to the location indicated by the offset. For example, if the offset has a value of 10 (hexadecimal), the execution of the LJMP instruction at address 53 of instruction table 405 will cause a jump into the jump table at the location corresponding to the instruction LJMP IRQ4.4. The processor will then execute another LJMP instruction, which will cause a jump to the service routine necessary to resolve the interrupt. Thus, for this example, execution of the instruction LJMP IRQ4.4 will cause a jump to the service routine for IRQ4, bit 4. The processor then may execute the service routine to resolve the interrupt corresponding to IRQ4, bit 4.

Figure 4B:
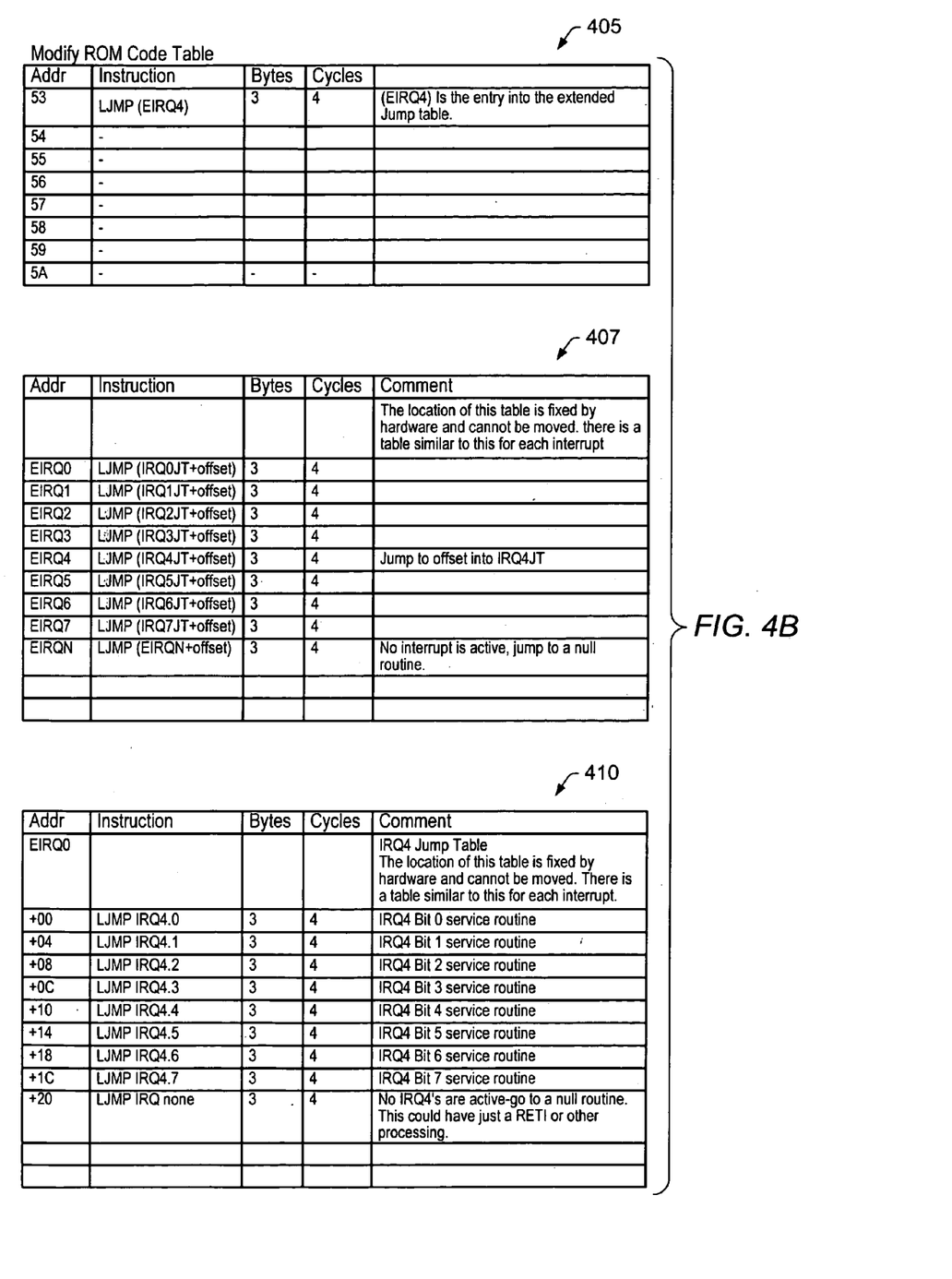
FIG. 4B is a drawing illustrating another embodiment wherein a ROM code table is modified in order to cause a jump to a service routine for a particular interrupt.

FIG. 4B is a drawing illustrating another embodiment wherein a ROM code table is modified in order to cause a jump to a service routine for a particular interrupt. In the embodiment shown, FIG. 4B includes instruction table 405, jump table 410, and also includes ROM code table 407. ROM code table 407 includes a plurality of addresses, with an LJMP instruction associated with each address. The LJMP instruction in each entry of ROM code table 407 includes a jump table address corresponding to an entry in a jump table associated with a group of interrupts In this embodiment, execution of the LJMP instruction at address 53 of instruction table 405 causes a jump into ROM code table 407. The specific location in ROM code table 407 into which the jump occurs is specified by an entry associated with the LJMP instruction, which is EIRQ4 in this particular example. After this jump completed, a trap is performed, and the address originally associated with the LJMP instruction in ROM code table 407 is substituted with an address and an offset corresponding to the service routine of the particular interrupt. For this example, the entry corresponding to the EIRQ4 address in ROM code table 407 stores an LJMP instruction with an operand (IRQ4JT+offset) that directs a jump into jump table 410. The interrupt group IRQ4 is associated with jump table 410 in this example, although jump tables exist for the other interrupt groups as well. As with the example of FIG. 4A, the address and offset direct a jump to a specific location of the jump table associated with an interrupt group. The execution of the LJMP instruction in jump table 410 (or in general, the jump table associated with the interrupt group) then causes a jump to the service routine associated with the interrupt.

In addition to the embodiments discussed in reference to FIGS. 4A and 4B other methods of effecting the necessary jumps to a service routine are possible and contemplated.

For example, one embodiment may use memory-mapped registers, wherein the memory mapped registers may store information which redirects the processor when performing jump instructions.

Figure 5:
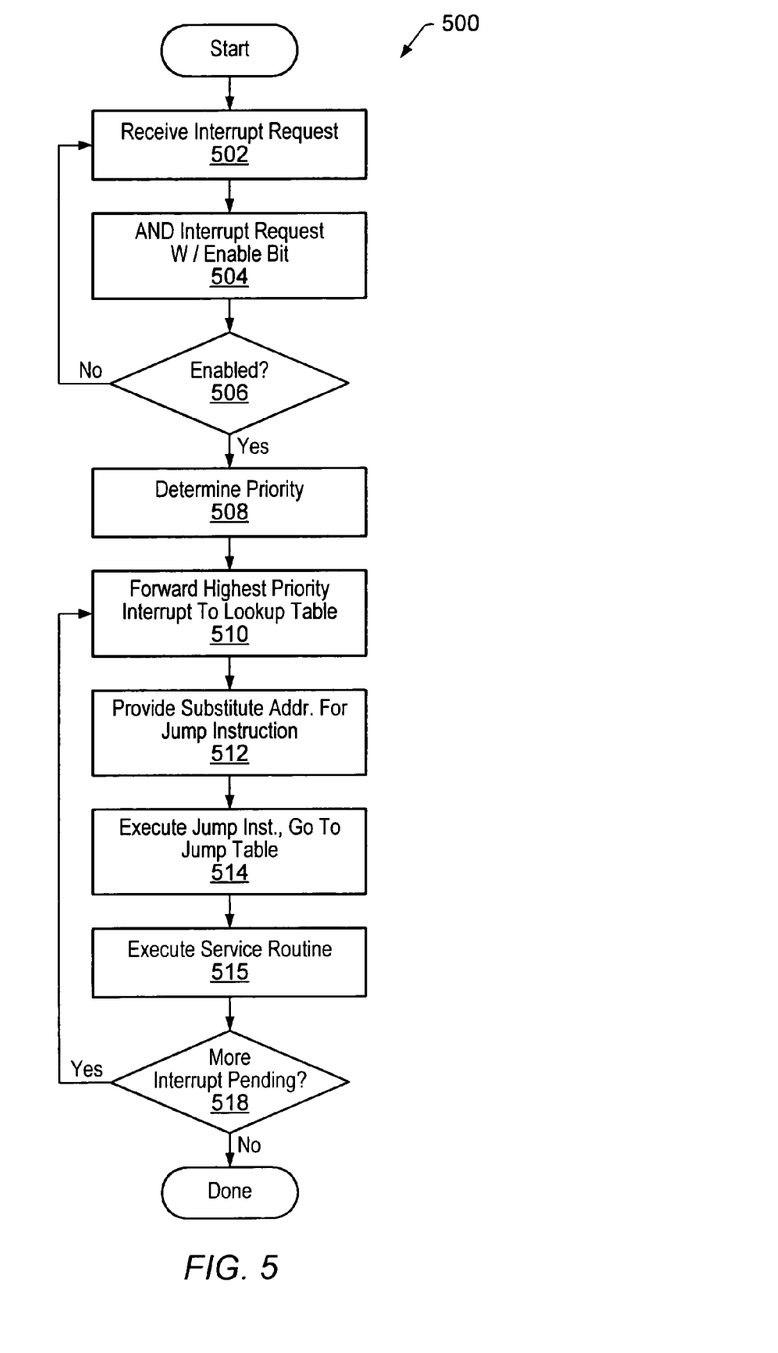
FIG. 5 is a flow diagram of one embodiment of a method for handling an interrupt.

Turning now to FIG. 5 a flow diagram of one embodiment of a method for handling an interrupt is shown. Other embodiments or variations on this particular embodiment are possible and contemplated.

Method 500 begins with the receiving of an interrupt (or service) request by a processor (502). The interrupt request may be received from any device coupled to the processor, and indicates that the device that is the source of the request requires service from the processor. In one embodiment, a bit in a source register (such as that discussed above in reference to FIGS. 2 and 3) is set responsive to receiving the interrupt request.

Servicing the interrupt request requires that the interrupt be enabled for some embodiments. Thus, the bit in the source register that was set responsive to receiving the interrupt request is logically ANDed with a bit that indicates whether or not the interrupt is enabled (504). If the interrupt is not enabled, the method may return to 502 and wait until another interrupt request is received (506, No). If the interrupt is enabled (506, Yes), information concerning the interrupt may be forwarded to a priority encoder. If multiple interrupts are pending, the priority encoder determines the priority of the interrupt with respect to the other pending interrupts (508). After determining any priority issues, information corresponding to the highest priority interrupt is forwarded to a lookup table (510). If no other interrupts are pending, information corresponding to the interrupt received in 502 is forwarded, although generally speaking it will eventually be forwarded to the lookup table in accordance with the priority sequence determined by the priority encoder.

After the interrupt information is received by the lookup table, a lookup operation is performed an the substitute address (or generally, substitute vector) for a jump instruction is provided (512). The substitute address may replace an address that was issued with the jump instruction, and may redirect the processor when the jump instruction is executed. The jump instruction, when executed, may cause a jump into a jump table (514). In one embodiment, such as that discussed in reference to FIG. 4A, execution of the jump instruction causes a direct jump into the jump table. In other embodiments, such as that discussed in reference to FIG. 4B, at least one intermediate jump may be present before completing the jump into the jump table.

After jumping into the jump table, another jump instruction is executed. This jump instruction causes execution of a service routine that services an interrupt (515). If multiple interrupts are pending (518), method 500 returns to 510 and information corresponding to the next interrupt to be service is forwarded to the lookup table.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A method for handling an interrupt, the method comprising:
    receiving an interrupt request corresponding to a particular interrupt;
    upon receiving the interrupt request, substituting a vector corresponding to a group of interrupts with a vector corresponding to the particular interrupt, wherein said substituting does not require performing a polling operation; and
    jumping to a service routine corresponding to the particular interrupt responsive to said substituting.

2. The method as recited in claim 1 further comprising obtaining the vector corresponding to the particular interrupt from a lookup table.

3. The method as recited in claim 2 wherein the vectors corresponding to a group of interrupts and the particular interrupt are addresses.

4. The method as recited in claim 3, wherein the lookup table includes an address corresponding to the group of interrupts and a plurality of addresses each corresponding to one of a plurality of particular interrupts, and wherein each of the plurality of particular interrupts has a corresponding service routine.

5. The method as recited in claim 4, wherein the address of the particular interrupt is the address of the group of interrupts combined with an offset address.

6. The method as recited in claim 5, further comprising
    trapping an interrupt vector address responsive to said receiving the interrupt request and substituting the interrupt vector address with a jump table address;
    executing a first jump instruction, wherein execution of the first jump instruction causes a jump into a jump table at the jump table address, wherein an entry associated with the jump table address includes a second jump instruction; and
    executing the second jump instruction, wherein said executing the second jump instruction causes a jump to the service routine corresponding to the particular interrupt.

7. The method as recited in claim 5, further comprising:
    executing a first jump instruction, wherein said executing the first jump instruction causes a jump into an entry in a code table indicated by a code table address, wherein the entry indicated by the code table address includes a second jump instruction and an associated jump table address;
    trapping an interrupt vector address responsive to said receiving the interrupt request and substituting the interrupt vector address with the code table address;
    executing the second jump instruction, wherein said executing the second jump instruction causes a jump into an entry in a jump table indicated by the jump table address, wherein the entry associated in the jump table address includes a third jump instruction; and
    executing the third jump instruction, wherein executing the third jump instruction causes a jump to the service routine corresponding to the particular interrupt.

8. The method as recited in claim 1 further comprising:
    setting a first bit in a first register responsive to receiving the interrupt request;
    ANDing the first bit with a second bit, the second bit stored in a second register, wherein the second bit corresponds to the first bit, wherein said ANDing produces a third bit, wherein setting of the third bit is indicative that the interrupt request corresponding to the particular interrupt was received and that the particular interrupt is enabled.

9. The method as recited in claim 8 further comprising resolving a priority of the particular interrupt within a plurality of interrupts.

10. The method as recited in claim 1 further comprising executing the service routine responsive to said jumping.

11. A processor comprising:
an interrupt source register, wherein the interrupt source register configured to store a plurality of bits including a first bit corresponding to a particular interrupt, wherein the first bit is set responsive to receiving an interrupt request; and
a read-only memory (ROM), wherein the ROM is configured to store a vector corresponding to a group of interrupts and a vector corresponding to the particular interrupt;
wherein the processor is configured to substitute the vector corresponding to the group of interrupts with the vector corresponding to the particular interrupt and further configured to jump to a service routine corresponding to the particular interrupt.

12. The processor as recited in claim 11, wherein the processor includes an enable register configured to store a second bit, the second bit corresponding to the particular interrupt, wherein the second bit, when set, is indicative of the interrupt being enabled.

13. The processor as recited in claim 12, wherein the processor implements an AND function configured to produce a third bit based on the first bit and the second bit, wherein the third bit, when set, is indicative that an interrupt request corresponding to the particular interrupt has been received by the processor and that the particular interrupt is enabled.

14. The processor as recited in claim 13, wherein the processor includes a priority encoder coupled to receive the third bit, wherein the priority encoder is configured to resolve a priority of the particular interrupt within a plurality of interrupts.

15. The processor as recited as recited in claim 14, wherein the processor includes a lookup table coupled to the priority encoder, wherein the lookup table includes an address corresponding to the group of interrupts and a plurality of addresses each corresponding to one of a plurality of particular interrupts, and wherein each of the plurality of particular interrupts has a corresponding service routine.

16. The processor as recited in claim 11, wherein the vector corresponding to the group of interrupts and the vector corresponding to the particular interrupt are addresses.

17. The processor as recited in claim 16, wherein the vector corresponding to the particular interrupt includes an interrupt group address and an offset address.

18. The processor as recited in claim 17, wherein the processor is further configured to:
trap an interrupt vector address responsive to receiving the interrupt request, and substitute the interrupt vector address with a jump table address;
execute a first jump instruction, wherein execution of the first jump instruction causes a jump into a jump table at the jump table address, wherein an entry associated with the jump table address includes a second jump instruction; and
execute the second jump instruction, wherein said executing the second jump instruction causes a jump to the service routine corresponding to the particular interrupt.

19. The processor as recited in claim 17, wherein the processor is further configured to:
execute a first jump instruction, wherein executing the first jump instruction causes a jump into an entry in a code table indicated by a code table address, wherein the entry indicated by the code table address includes a second jump instruction and an associated jump table address;
trap an interrupt vector address responsive to receiving the interrupt request and substitute the interrupt vector address with the code table address;
execute the second jump instruction, wherein executing the second jump instruction causes a jump into an entry in a jump table indicated by the jump table address, wherein the entry associated in the jump table address includes a third jump instruction; and
execute the third jump instruction, wherein executing the third jump instruction causes a jump to the service routine corresponding to the particular interrupt.

20. The processor as recited in claim 11, wherein the processor is configured to execute the service routine in order to resolve the particular interrupt.

* * * * *

UNITED STATES PATENT AND TRADEMARK OFFICE
CERTIFICATE OF CORRECTION

PATENT NO. : 7,139,857 B2 Page 1 of 1
APPLICATION NO. : 10/706741
DATED : November 21, 2006
INVENTOR(S) : Richard E. Wahler It is certified that error appears in the above-identified patent and that said Letters Patent is hereby corrected as shown below:

In the Claims:

Column 9 Line 35, please delete "The processor as recited as recited in claim 14" and substitute -- The processor as recited in claim 14 --.

Signed and Sealed this

Sixth Day of March, 2007

JON W. DUDAS
*Director of the United States Patent and Trademark Office*